US005090101A

United States Patent [19]

Welty

[11] Patent Number: 5,090,101

[45] Date of Patent: Feb. 25, 1992

[54] DUCT CORNER INSTALLATION TOOL

[75] Inventor: Robert E. Welty, Cedar Rapids, Iowa

[73] Assignee: Iowa Precision Industries, Inc., Cedar Rapids, Iowa

[21] Appl. No.: 584,478

[22] Filed: Sep. 18, 1990

[51] Int. Cl.[5] .............. B23P 11/00

[52] U.S. Cl. .............. 29/243.5

[58] Field of Search .............. 29/243.5, 243.57, 243.58; 72/407

[56] References Cited

U.S. PATENT DOCUMENTS 4,318,211 3/1982 Haskinson .............. 29/243.5
4,515,355 5/1985 Hunter .............. 269/234
4,619,448 10/1986 Leibinger et al. .............. 269/244
4,713,959 12/1987 Bennett .............. 29/243.5
4,823,455 4/1989 Desiro .............. 29/243.5
4,957,257 9/1990 Gonzales .............. 269/156

*Primary Examiner*—Robert C. Watson
*Attorney, Agent, or Firm*—James C. Nemmers

[57] ABSTRACT

A hand-held power tool for installing the corners of transverse duct systems. The tool has powered jaws that, when placed over a standard corner piece and one of the flanges of the duct, will first clamp the corner piece in place on the flange and then crimp the flange over the corner piece to complete the installation. Both operations of clamping and crimping are accomplished with a single stroke of the operating rod of an air cylinder.

7 Claims, 1 Drawing Sheet

DUCT CORNER INSTALLATION TOOL

BACKGROUND OF THE INVENTION

Ductwork that is used for circulating air in heating and air conditioning systems usually includes a series of box-shaped sections connected together to form a duct of the desired length. Each of the box-shaped sections has a flange extending transversely outwardly from each side at each end of the section to provide for connection of one section to another completed section. The sections are connected at each of the corners of the flanges by placing a standard corner piece along the flanges of each section and then forcing this corner piece down into the flanges after which the outer edges of the flanges are crimped over the corner piece to retain it in place. The corner pieces are then bolted or otherwise connected together to join the two sections. At the present time, the corner pieces are installed by using a hammer to pound the corner piece into place on the flanges, and then the outer edge of the flanges are hammered over to hold the corner piece in place. There are also available tools resembling large pliers or tongs which can be used to force the corner piece onto the flanges and then used to crimp over the outer edges of the flanges to hold the corner piece in place. Obviously, even in the hands of a skilled user, these are somewhat slow and cumbersome procedures for installing the corners of a box section. Especially when heavier gauges of sheet metal are used in the making the ducts, it requires a considerable amount of strength and is quite tiresome to repeatedly perform these operations.

Therefore, there is a need for a way to more quickly perform the corner installation operation, thus producing a substantial savings in labor costs. Moreover, there is a further need to provide an improved and better way of performing these operations with less fatigue to the worker while at the same time providing a quality installation.

SUMMARY OF THE INVENTION

The invention provides a hand-held pneumatic power tool that has a pair of jaws, one of which is stationery, and the other of which is pivotly mounted. The pivotly mounted jaw is forced downwardly toward the stationery jaw by a cam follower that rides on the cam surface of a moveable operating rod. At the outer end of the operating rod is a crimper that will perform the crimping operation at the end of the stroke of the operating rod after the jaws have forced the corner piece into the flange. Thus, when the air cylinder is actuated by the operator, the operating rod will advance and force the upper jaw downwardly toward the stationery jaw so as to properly force the corner piece into the groove or valley provided between the outer edge of the flange and the body of the duct. The cam surface will maintain the jaws closed until the operating rod completes its stroke, at the end of which the advancing end of the operating rod will bend over or crimp the edge of the flange down over the corner piece. At the end of its stroke, the operating rod will automatically be retracted, thus opening the jaws in readiness for re-use.

DESCRIPTION OF THE PREFERRED EMBODIMENT OF THE INVENTION

Figure 2:
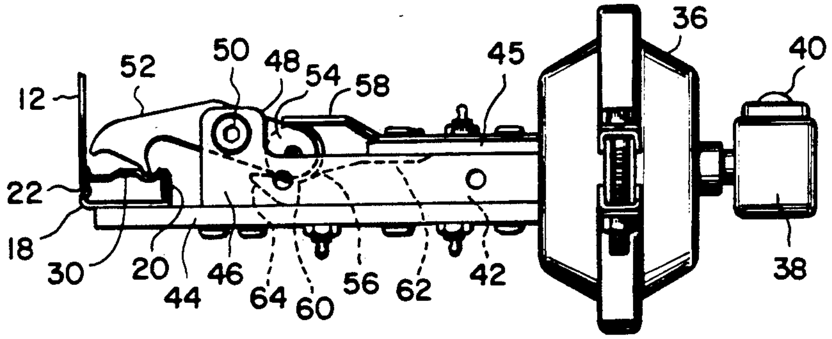
FIG. 2 is a side elevational view showing the tool of the invention with the jaws open and in a position ready to perform the installation of the corner piece.

In the drawings, there are shown portions of two sides of a box section that have flanges which form a corner into which a corner piece is to be installed to provide for the connection of two box sections. One such side 10 has a sheet metal wall 12 that forms one of the four walls of the box section, which wall 12 is joined to the sheet metal wall 16 of a second side 14. Formed integrally with the wall 12 is a flange 18 which has an outer edge 20 that is normally doubled over as best seen in FIG. 2. Also, the wall 12 has a crimp 22 formed in it just above the flange 18, which crimp 22 extends outwardly into the groove 24 formed between the wall 12 and the outer edge 20.

Similarly, the box section wall 16 has a flange 26 and an outer edge 28, with the wall 16 also formed with a crimp (not shown) similar to crimp 22 of the wall 12.

Figure 1:
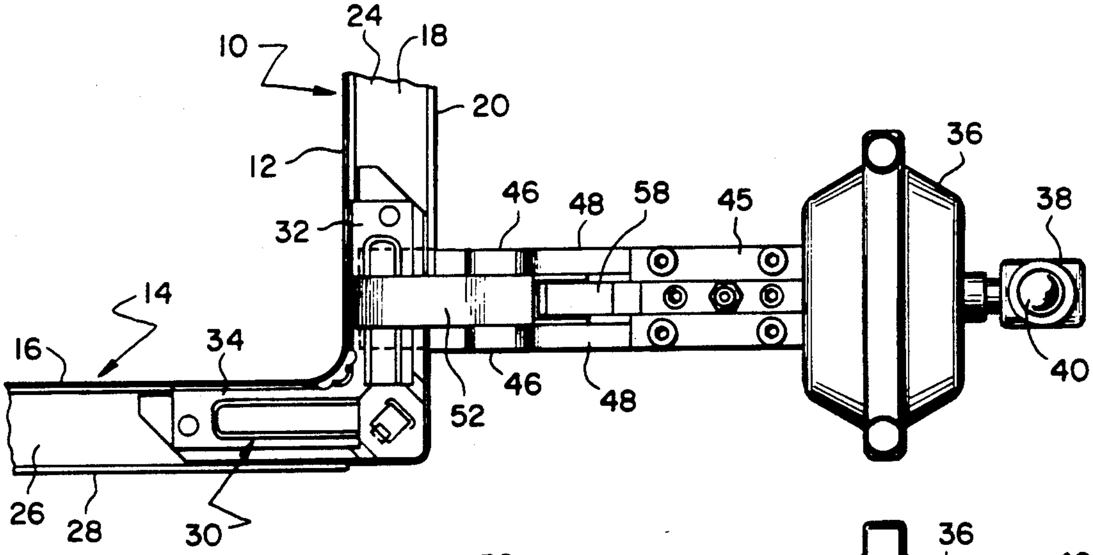
FIG. 1 is a top plan view of a tool constructed according to the invention and showing one corner of a box section in position for installation of the corner piece.
Figure 3:
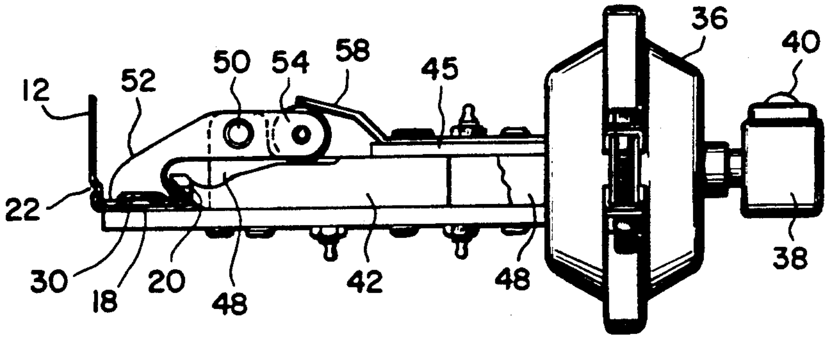
FIG. 3 is a side elevational view similar to FIG. 2 and showing the jaws closed and the crimping operation completed at the end of the stroke of the operating rod.

Formation of the walls 12 and 16 with their flanges is well known to those skilled in the art, and the walls are standard configurations for sheet metal box sections. As illustrated in FIG. 1, when two box sections are to be connected, the flanges 18 and 26 form a corner for receiving a corner piece 30 that is used to join two box sections. Corner piece 30 may be of any suitable design, several of which are well known to those skilled in the art, and includes legs 32 and 34 formed at right angles to each other to form a single integral corner piece 30. As best illustrated in FIG. 2, the width of each leg 32 or 34 is slightly greater than the distance between the crimp 22 and the outer edge 20 so that the corner piece 30 must be forced downwardly past the crimp 22, which serves to hold the corner piece 30 in place on the flange 18 along with the outer edge 20 after it is crimped over the corner piece 30 as illustrated in FIG. 3. Normally, the corner piece 30 is forced down into the groove 24 by use of a hammer, large tongs, or other suitable tool, and when the corner piece 30 is beneath the crimp 22 and resting on the flange 18, the outer edge 20 is bent over to hold the corner piece 30 securely in place. The outer edge 20 is commonly bent over using a hammer or large pliers, etc., none of which are very satisfactory.

The drawing illustrates the tool of the invention which includes an air cylinder 36 connected to a source of pressurized air (not shown) through a valve-connector 38 which in turn is connected to an air hose (not shown) connected to the source of pressurized air in a suitable well known manner. Connector 38 also includes a normally-closed valve which can be opened to admit pressurized air to the cylinder 36 by pressing an operating button 40 at the top of the connector 38.

The air cylinder 36 powers an operating rod 42 that moves along a stationery jaw 44 between two laterally spaced apart supporting arms 46 that are connected to the stationery jaw 44 and are also connected to a retainer 45 positioned above the rod 42. The operating rod 42 is moveable outwardly and inwardly by the air cylinder 36 during a single cycle when operating button 40 is pressed.

The arms 46 have upwardly extending supports 48 for a pivot pin 50 to which there is connected a moveable jaw 52. As best seen in FIGS. 2 and 3, the outer end of the moveable jaw 52 is positioned above the outer end of the stationary jaw 44 while the inner end of the moveable jaw 52 has a cam roller follower 54 which engages a cam surface 56 on the top of the operating rod 42. A leaf spring 58 secured to the retainer 45 biases the cam follower 54 downwardly so that it is always engaged with the cam surface 56.

As best seen in FIGS. 2 and 3, the cam surface 56 contains a concave surface 60 which when engaged by the cam follower 54 will pivot the moveable jaw 52 to an open position as shown in FIG. 2. This is the normal position of the operating rod 42 and moveable jaw 52 before the air cylinder 36 is actuated. In this normal position, the tool can be positioned as shown in FIG. 2 with the stationery jaw 44 beneath the flange 18 and supporting the flange 18, and with the moveable jaw 52 positioned above the corner piece 30 which has been manually positioned so that one edge rests on the crimp 22 and the other edge rests on top of the outer edge 20. The tool of the invention is now ready to be actuated by the user by pressing the operating button 40 which will admit pressurized air to the air cylinder 36 and drive the operating rod 42 outwardly or forwardly. As the operating rod 42 moves forwardly, the cam follower 54 will ride up the cam surface 56 forcing the moveable jaw 52 to pivot downwardly and thus force the corner piece 30 into the groove 24 beneath the crimp 22. As the operating rod 42 continues its forward movement, the cam follower 54 will ride on a substantially straight or level surface 62 to keep the jaws closed, and as the operating rod 42 advances to the end of its stroke, the tip 64 of the operating rod 42 will engage the outer edge 20 and bend it downwardly over the corner piece 30. This is shown in FIG. 3 of the drawings which shows the operating rod 52 at the end of its stroke. To facilitate the crimping of the outer edge 20 over the corner piece 30, the tip 64 of the operating rod is formed with a beveled, upwardly turned lower surface as shown in the drawing. When the operating rod 42 has reached the end of its stroke, it will automatically be retracted by the air cylinder. When this occurs, the spring 58 will force the cam follower 54 to follow the cam surface 56 pivoting the moveable jaw 52 upwardly and thus opening the jaws and permitting the tool to be withdrawn and ready for another operation.

The complete operation of the tool of the invention is evident from the foregoing description, and it should be evident from that description that the tool is a very simple but effective and useful tool that performs the two operations of clamping the corner piece 30 in place and crimping the outer edge 20 of the flange 18 over the corner piece to complete the installation of the corner piece at one corner of a box section. Obviously, the single operation that is described above is repeated on the flange 26 of the side 14 to complete the installation of the corner piece at one corner of the box section. Also, if desired, the operation may be repeated two or three times on each of the two flanges at a corner. Once one corner piece is installed, the identical operation is performed at the other seven corners of the box section to ready that section for joining to another box section.

From the foregoing description, it will be evident that the tool is easy to use, requiring only that the operator position the tool after the corner piece is in place and then actuate the operating button 40 just once. The clamping-crimping operation is thus completed in a matter of seconds with little effort on the part of the operator. With a minimum of moving parts, maintenance of the tool is minimal, and because of the speed of operation and ease of use, the hand tool of the invention will quickly pay for itself. The tool of the invention will provide a consistent, clean, tight, sturdy corner connection with no distortion of the flanges of the duct.

Having thus described the invention in connection with the preferred embodiment thereof, it will be evident to those skilled in the art that various revisions and modifications can be made to the preferred embodiment disclosed herein without departing from the spirit and scope of the invention. It is my intention, however, that all such revisions and modifications as are obvious to those skilled in the art will be included within the scope of the following claims.

What is claimed is as follows:

1. A tool for installing a corner piece in the flange of a sheet metal duct by pressing the corner piece into the flange and crimping the edge of the flange over the corner piece, said tool comprising: a pair of jaws moveable toward and away from each other from an open position to a closed position, operating means moveable relative to the jaws and operatively combined with the jaws to move the jaws from an open position to a closed position, and power means for moving the operating means when the power means is actuated by the user of the tool, said operating means also having an operating tip engageable with the edge of the flange when the jaws are closed to crimp the edge over the corner piece after the corner piece has been pressed into the flange by the jaws.

2. A tool for installing a corner piece in the flange of a sheet metal duct by pressing the corner piece into the flange and crimping the edge of the flange over the corner piece, said tool comprising: a pair of jaws moveable toward and away from each other from an open position to a closed position, one of the jaws being stationary and the other jaw being mounted for pivotal movement toward and away from the stationary jaw, operating means moveable relative to the jaws and operatively combined with the jaws to cause the moveable jaw to pivot and thereby move the jaws from an open position to a closed position, and power means for moving the operating means when the power means is actuated by the user of the tool, said operating means also being engageable with the edge of the flange to crimp the edge over the corner piece when the jaws are in the closed position.

3. The tool of claim 2 in which the operating means includes an operating rod having a cam surface, the operating rod is advanced toward the jaws and retracted from the jaws during a single cycle of the power means, and the moveable jaw includes a cam follower engageable with the cam surface of the operation rod to pivot the moveable jaw toward the stationary jaw when the operation rod is advanced toward the jaws and to pivot the moveable jaw away from the stationary jaw when the rod is retracted from the jaws.

4. The tool of claim 3 in which the operating rod has an outer end engageable with the edge of the flange when the operating rod is near the end of its advancement toward the jaws thereby crimping the edge over the corner piece when the rod completes its advancement.

5. The tool of claim 4 in which the cam follower is biased against the cam surface by resilient means.

6. The tool of claim 4 in which the operating rod is supported by and moveable along the upper surface of the stationary jaw.

7. The tool of claim 6 in which the power means is an air cylinder.

* * * * *